Aug. 30, 1955 J. D. LEAR 2,716,306
AEROSOL GENERATING MACHINE
Filed Jan. 18, 1954 3 Sheets-Sheet 1

INVENTOR.
Joseph D. Lear,
BY Albert R. Henry
ATTORNEY

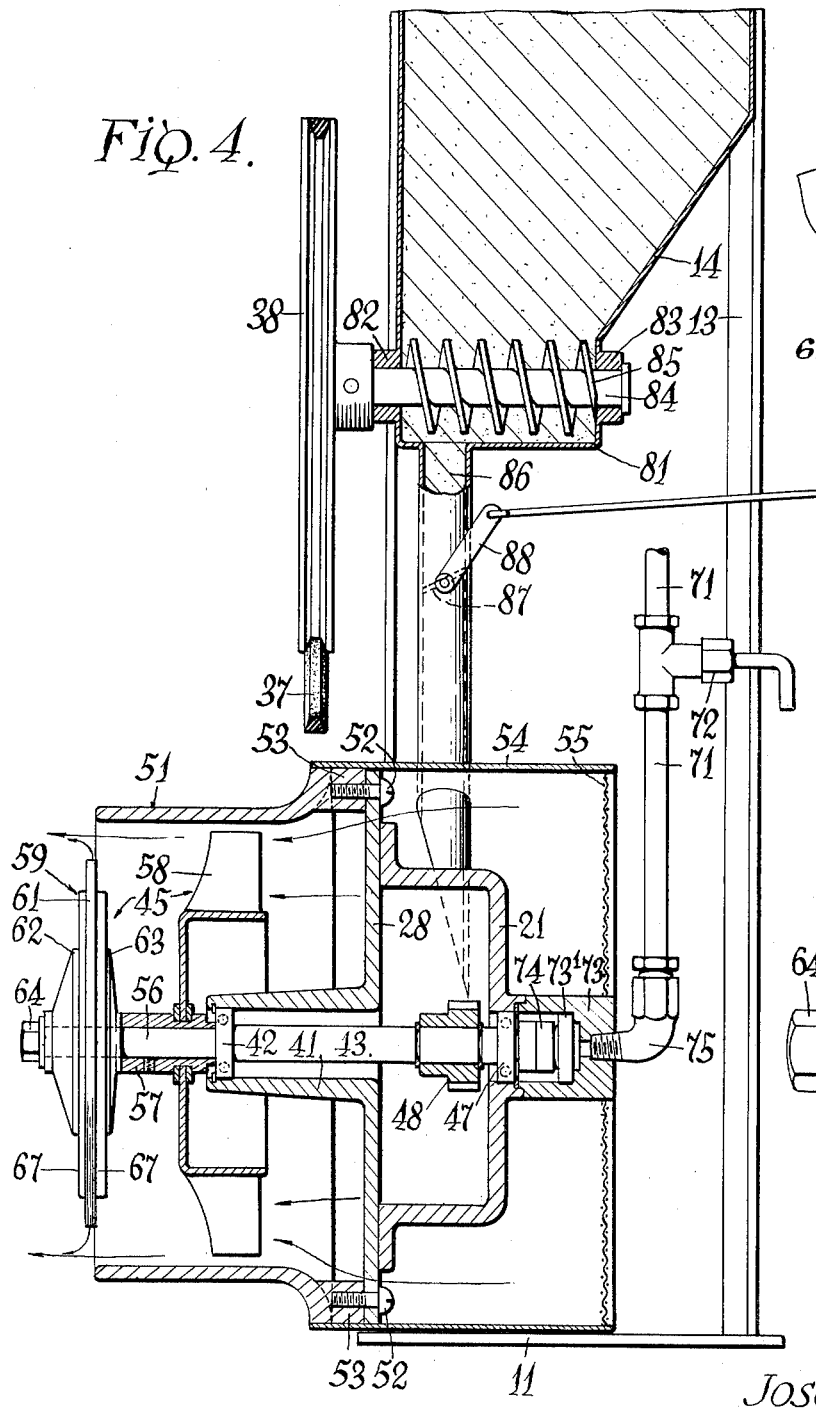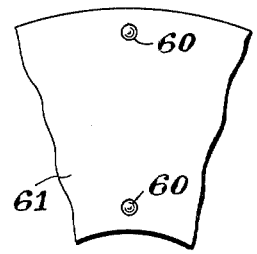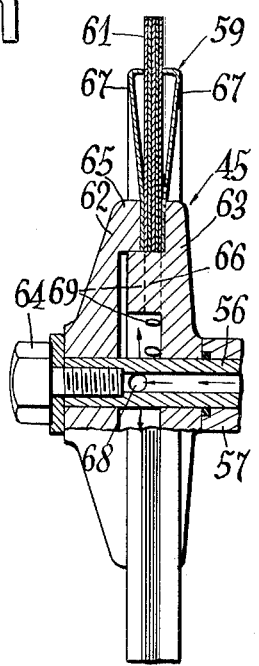

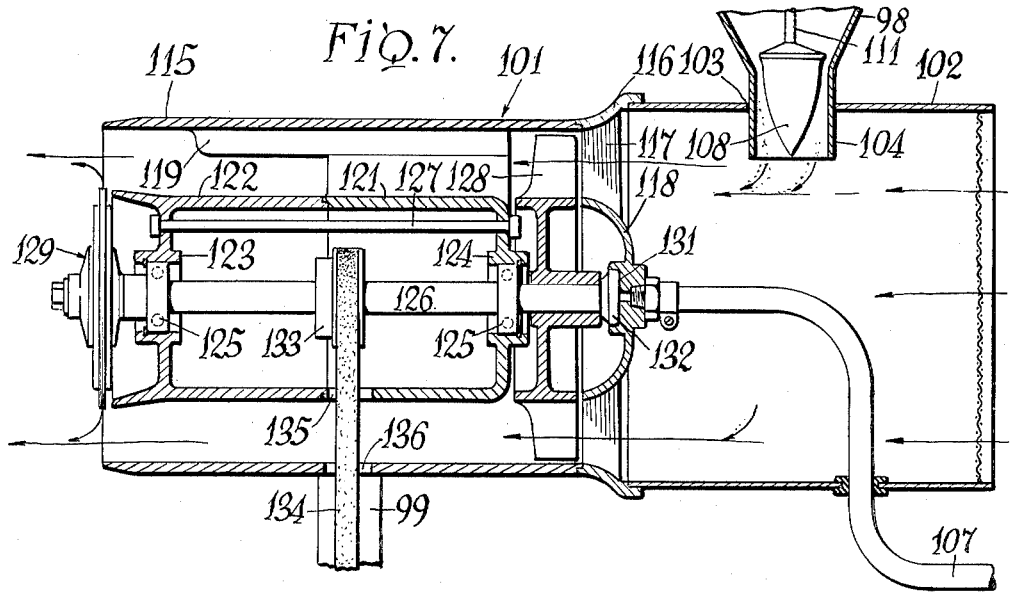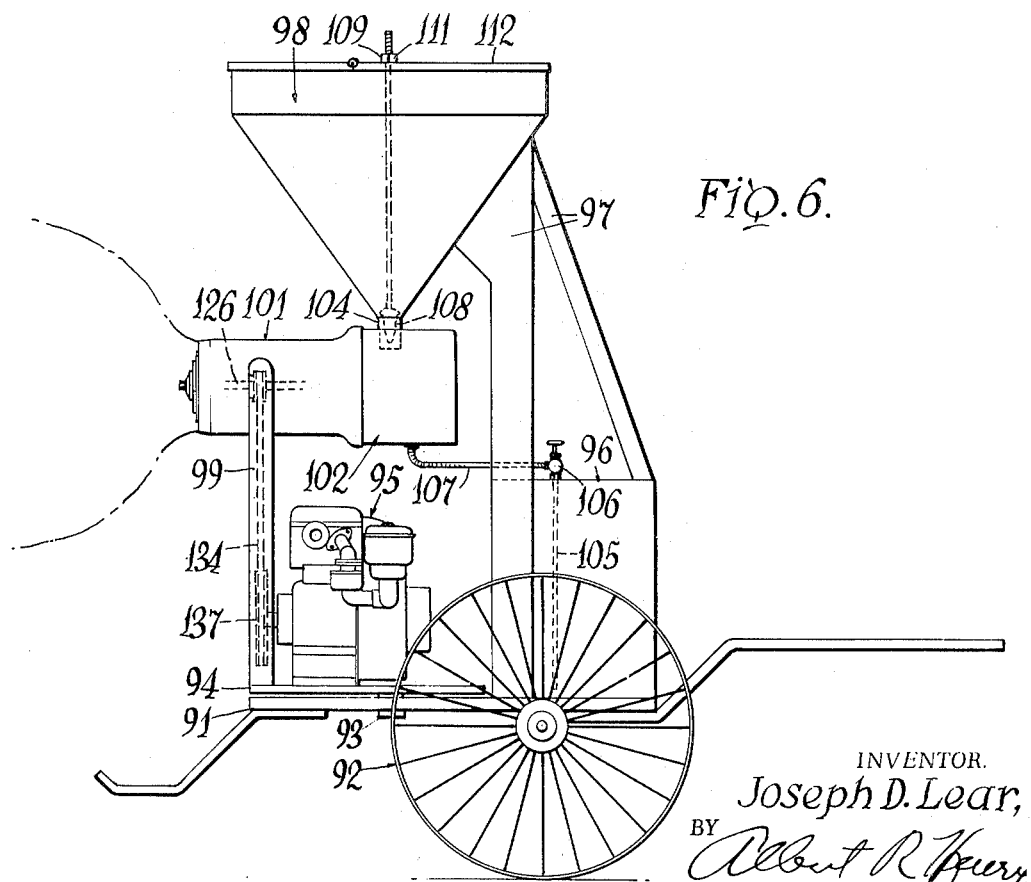

United States Patent Office 2,716,306
Patented Aug. 30, 1955

2,716,306

AEROSOL GENERATING MACHINE

Joseph D. Lear, Silver Creek, N. Y., assignor to Silver Creek Precision Corporation, Silver Creek, N. Y.

Application January 18, 1954, Serial No. 404,692

6 Claims. (Cl. 43—148)

This invention relates to a machine for generating a fog or mist of fine particles, frequently termed an "aerosol," which may be projected toward and distributed over foliage, fields, buildings, and the like, for the control of destructive insects, fungi, and other pests. More particularly, the invention contemplates a generator in which a solid control agent, in the form of a powder, is admixed with a wetting agent at the point of formation of the aerosol, thereby conserving the amount of agent required for a given dosage, and assuring its better distribution.

Machines have heretofore been proposed for propelling a cloud of air-borne powder over the area to be treated, and machines are also known for propelling an emulsion or suspension of solid material in water or other liquid, to attain the same ultimate result. Dusting with dry powder has the disadvantage of being wasteful, since a substantial proportion of the powder settles to the ground, and does not adhere to the vegetation, which thereby remains vulnerable to attack. When the powder is admixed with liquid, better adhesion may be obtained. However, in machines dispensing liquid and solid mixtures, it is necessary to provide large mixing tanks with mechanical agitators to maintain the powder in suspension, and, further, the particles in suspension are likely to clog the spray nozzles. In addition, the ratio of liquid to powder must be maintained as such a high level that the resulting fog lacks an effective concentration of the powder, when compared with the dry dusting procedure, thus requiring repeated applications to obtain the desired dosage.

I have discovered that dry powder may be admixed with and wetted by the liquid, as the aerosol is generated and projected into the air, and I have devised a machine to utilize my discovery, which eliminates the need for large mixing tanks and agitators therefor, minimizes the problem of clogging, and which reduces the previously required ratio of liquid to solid, thereby bringing up the concentration of the active agent to a satisfactory value.

Typical embodiments of machines incorporating the principles of the invention are illustrated in the accompanying drawing, wherein.

Figure 1:
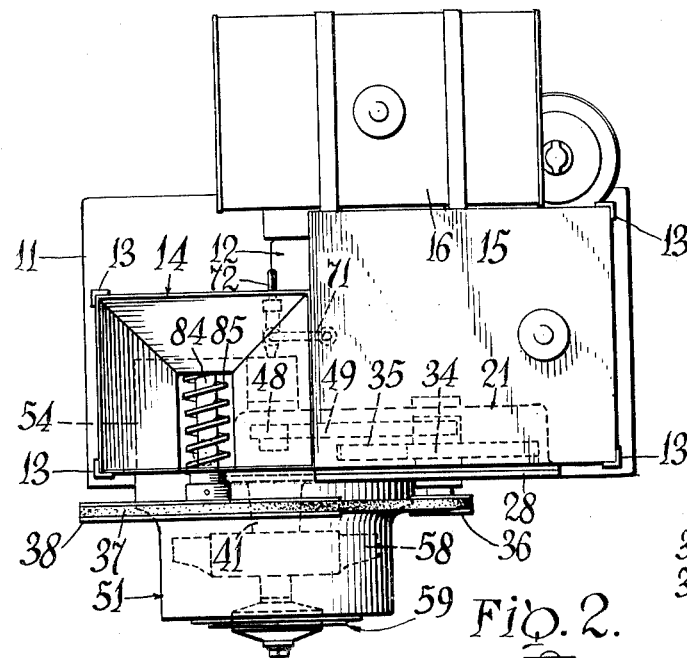
Fig. 1 is a top view of one form of the invention.
Figure 3:
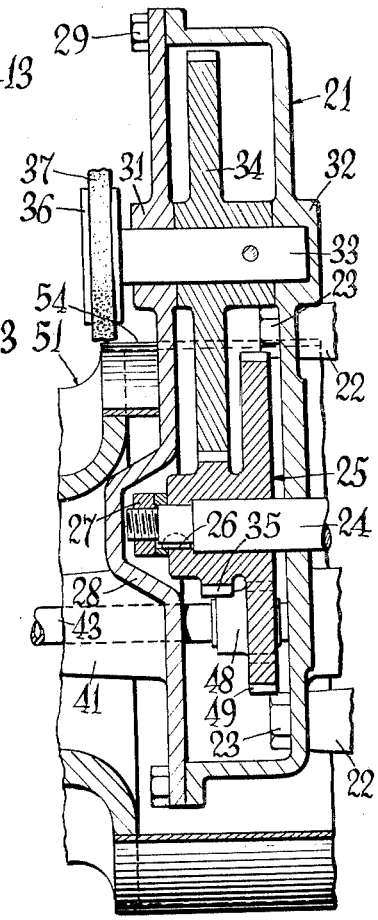
Figure 2:
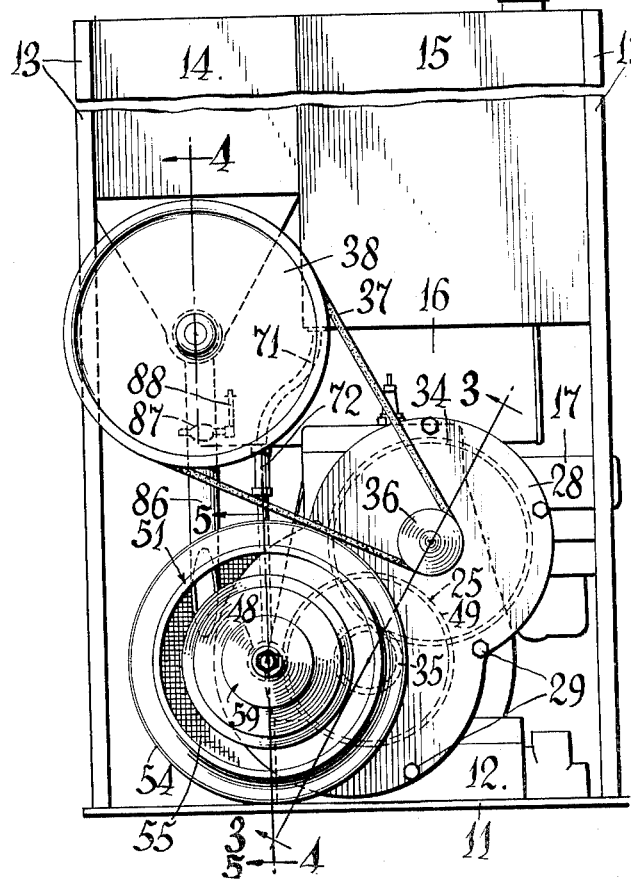
Fig. 2 is a front elevation thereof.

Figs. 3, 4, and 5 are enlarged sections on the correspondingly numbered lines of Fig. 2;

Fig. 5A is a fragmentary plan view of an impeller disc;

Fig. 6 is a side elevation of another form of the invention; and,

Fig. 7 is an enlarged axial section through the blower head of Fig. 6.

Referring to Figs. 1 through 5, the machine comprises a base 11 on which is mounted an internal combustion engine 12. Vertical uprights 13 secured to the base extend thereabove and support a hopper 14 for dry powder, and a tank 15 for wetting liquid. In the type of engine utilized in reducing the invention to practice, the gasoline tank 16 and exhaust pipe 17 are attached directly to the engine 12.

A gear box 21 is mounted directly on the engine 12, through bosses 22 provided on the engine casing for such purpose, which receive screws 23. The engine shaft 24 extends into the box 21, and has mounted on the end thereof a cluster gear 25, by means of a key 26 and nut 27. A cover plate 28 is secured to the box 21 by screws 29, and the plate and box are formed with aligned bearings 31, 32, in which is mounted a shaft 33 having pinned thereon a gear 34 in mesh with the small or pinion gear 35 of the cluster gear 25. The outer end of the shaft 33 is provided with a pulley 36, encircled by a belt 37 which also passes over a pulley 38 which is connected to the powder hopper 14, as will be presently described. It will be seen that this drive from the engine 12 to the pulley 38 provides a substantial speed reduction.

The cover plate 28 is also formed with a forwardly projecting hollow boss 41 or shaft housing containing a ball bearing 42 for a hollow shaft 43, constituting a drive for a blower-impeller unit, generally designated by the numeral 45. The inner end of the shaft 43 is journaled in a ball bearing 47, mounted in aligned relationship with the bearing 42 in a bore formed in the gear box 21. A pinion 48 is fixedly mounted on the shaft 43, to mesh with the large gear 49 of the cluster gear 25, and thus drive the shaft 43 at high speed compared to that of the engine 12. The blower-impeller unit 45 is concentrically positioned in a cylindrical tunnel 51, provided with a slightly belled mouth at its rear end, for connection to the cover plate 28 by means of screws 52 positioned in tapped bosses 53 on the periphery of the tunnel. A generally cylindrical shroud 54 is pressed over the rear end of the tunnel 51, to project rearwardly to a position under the hopper 14. It will be seen that the shroud 54 is located in part to the left hand side of the casing constituting box 21, and cover plate 28, as viewed in Figs. 2, 3 and 4 thereby providing a free air path through the shroud and into the tunnel 51. A screen 55 may be positioned over the inlet end of the shroud 54, to separate insects and the like from air passing therethrough.

The forward end of the shaft 43 is formed with a reduced portion 56, on which is fixed the hub 57 of a propeller fan 58. The outer end of the shaft 43 also receives an impeller or pump 59 which, as shown in Fig. 5, comprises a number of superimposed discs 61 clamped between opposed hub members 62 and 63, by means of a screw 64 engaged in the end of the shaft 43, to force the disc and hub assembly against the fan hub 57. The hubs 62 and 63 have complementary interfitting shoulders 65 and 66, which align the discs 61, and also outside dish-shaped plates 67, which engage the outside discs 61 outwardly toward their peripheries.

The scale of the drawing does not admit of specific illustration in Fig. 5, but as it shown in Fig. 5A, the discs 61 are formed with small protuberances or dimples 60 of only a few thousandths inch height from the surfaces, so that, upon assembly, there is a path between adjacent discs for the flow of fluid. The hollow shaft 43 is formed with a radial hole 68 between the hubs 62 and 63, and the shoulder 66 is formed with radial ducts 69, thereby establishing a fluid path from the interior of the shaft 43, between the hubs 62 and 63, and through the interstices between the discs 61, to the periphery of the impeller 59. When the shaft 43 is rotated, the fan 58 may induct air through the shroud 54 for discharge over the periphery of the impeller 59, and the impeller, in turn, may draw liquid from the tank 15 for discharge against the rim of the tunnel 51 and admixture with the air stream and material contained therein. It will be noted that the periphery of the impeller 59 is in line with or beyond the end of the tunnel 51, so that little liquid strikes the wall of the tunnel, but is all delivered to the powder in the air stream.

Liquid is supplied from the tank 15 to the impeller 59 through a conduit 71, in which is interposed an adjustable flow control valve 72. A gland 73 is secured to the rear face of the gear box 21, and it contains a conventional shaft seal, having a fixed part 73' engaging a shaft-mounted part 74. A fitting 75 connects the gland 73 to the pipe 72, thereby to admit liquid from the tank 15 to the right hand end of the hollow shaft 43, and thence into the impeller 59.

The bottom of the hopper 14 is formed with a generally cylindrical portion 81, including bearings 82 and 83, in which is mounted a shaft 84 carrying a screw conveyor 85. The forward end of the shaft 84 receives the pulley 38, so that the conveyor is driven by the engine 12 to force powder from the hopper into a discharge pipe 86, the lower end of which projects through the shroud 54 and into the path of air induced through the shroud by the fan 58. The rate of feed of the powder is controllable by a damper valve 87 in the pipe 86, to which is connected a manually operable linkage 88. The end of the pipe 86 is cut at an angle on the area facing the fan 58, as shown, so that the stream of air entering the shroud 54, and moving past the end of the pipe, may effectively entrain the particles of powder, and carry them into the tunnel 51, as particles of substantially colloidal size.

In operation, with the engine 12 running, powder is drawn from the hopper 14 for projection by the air stream against the blades of the fan 58, where the mechanical impingement serves to break up any agglomerates or lumps. The powder is then borne in the air stream past the periphery of the impeller 59, from which there is concomitantly emerging a high velocity stream of liquid particles as a fog or mist. The liquid, in its fine state of subdivision, wets the surface of substantially all of the particles, thus rendering them much more capable of adhering to the vegetation toward which the aerosol is projected. It has been found in practice that this instantaneous formation of an aerosol of wetted powder gives a much better coverage on the vegetation itself, with conservation of powder as compared to the dry dusting method. It may also be noted that while the powder may be fed to the discharge side of the fan, better coverage is effected by feeding to the suction side, because of the additional comminuting effect of the fan blades.

In the embodiment shown in Figs. 6 and 7, the deck 91 of a cart 92 has rotatably mounted thereon, by a pivot 93, a platform 94 on which in turn is mounted an internal combustion engine 95. A liquid tank 96 is also mounted on the deck 91, together with uprights 97 which support a hopper 98 for powder. Additional uprights 99 support a blower-impeller assembly, generally designated by the numeral 101, and the rear end or shroud portion 102 of such assembly is provided with an aperture 103 to receive the end of a spout 104 on the hopper 98. Liquid from the tank 96 is supplied to the impeller assembly through a suction pipe 105, control valve 106, and flexible conduit 107, so that the platform 94 may be swung laterally to either side through a limited arc. In passing, it may be noted as obvious that the previously described embodiment may also be mounted on a cart. The flow of powder from the hopper 98 into the shroud 102 may be regulated by a valve 108 engageable with the inner end of the spout 104, by manipulating a nut 109 on the upper end of the valve stem 111, which passes through a cover 112 on the hopper. It may be noted that the vibration of the engine 95 is sufficiently transmitted to the hopper 98 and valve 108 to cause the valve to vibrate also, and cause the powder to flow in a uniform manner. Very close regulation or metering is thereby obtained. Obviously, the valve 108 may be employed in the previously described embodiment, and the feed screw 85 may likewise be incorporated in the hopper 98.

The blower-impeller assembly 101 further comprises a cylindrical shell or tunnel section 115, connected to the shroud 102 through an adapter spider 116 having radial ribs 117 and a central hub 118. The tunnel 115 is formed with internal ribs 119 which engage ribs 121 of a two-part housing 122 to support the housing concentrically in the tunnel. Each part of the housing is formed with a radial end wall 123, 124, which is centrally bored to receive a ball bearing 125 for a hollow drive shaft 126. The housing sections are held together by through bolts 127.

A blower 128 is mounted on the right hand end of the shaft 126, to induce a draft of air and powder through the shroud 102 and to expel the mixture through the tunnel 115, in the manner previously described, and with the characteristic diffusion pattern indicated by the broken lines in Fig. 6. An impeller 129 is mounted on the left hand end of the shaft 126, and, as its construction and mode of operation has heretofore been described in detail, further explanation is deemed unnecessary. The hub 118 includes a gland 131 and shaft seal 132, also as heretofore described. One structural difference between this embodiment and the other is that the shaft 126 is belt driven. A pulley 133 on the shaft 126 receives a belt 134 which extends through slots 135 and 136 in the housing 122 and tunnel 115 to a relatively large diameter pulley 137 on the shaft of the engine 95.

It will be noted that, in both embodiments, the opening from the hopper supply pipe 86 or 104 is above the axis of the blower 58 or 128. These fans, running at high speed, induce a high velocity draft of air toward their suction sides and most of the powder which discharges from the hoppers is entrained above the fan axis. Any particles which may tend to drop below are nevertheless entrained in the air stream on the lower portions of the shrouds.

While the invention has been described with respect to two particular embodiments, it will be understood that it is not limited to the precise details thereof, but should be deemed to encompass all modifications and variations which fall within the scope of the appended claims.

I claim:

1. A machine for generating a mist, spray, or aerosol dispersion of surface wetted powder particles and expelling them into the atmosphere, comprising a generally cylindrical tubular member including a tunnel section and a shroud section, a power-driven shaft in the tunnel section, drive means for said shaft, a blower and an impeller mounted on said shaft, the direction of rotation of the shaft being such as to draw air in through the shroud section and expel it through the tunnel section adjacent the periphery of the impeller, a liquid supply tank, a supply conduit connecting the tank to the impeller, a hopper adapted to contain dry powder, a discharge pipe extending from the hopper on the inlet side of the blower, and valve means in the liquid supply conduit and the hopper discharge pipe for regulating the flow therethrough, whereby powder flowing from the hopper may be air-borne through the tunnel and wetted by liquid discharged from the impeller.

2. A machine for generating a mist or aerosol dispersion of surface wetted powder particles and expelling them into the atmosphere comprising a generally cylindrical member including a tunnel section and a shroud section, a power-driven shaft in the tunnel section, a circular impeller carried on the shaft and disposed slightly beyond the end of the tunnel section, a fan secured to said shaft in spaced relation to the impeller and also disposed within the tunnel section, a liquid supply tank and a supply line connecting the tank and the impeller, a powder supply hopper having a discharge outlet communicating with the shroud and the suction side of the fan, and valve means in the discharge outlet for regulating the flow of powder from the hopper.

3. A machine for generating a mist or aerosol dispersion of surface wetted powder particles and expelling them into the atmosphere comprising a generally cylindrical member including a tunnel section and a shroud section, a hollow shaft rotatably mounted in the tunnel section, a fan mounted on the shaft adjacent the shroud section, an impeller mounted on the shaft at the end of the tunnel section remote from the shroud section, a powder hopper mounted above the shroud section, said hopper having a valved discharge opening communicating with the shroud section and the suction side of the fan, said fan being adapted to induct powder from the shroud section for discharge through the tunnel section and past the periphery of the impeller, a liquid supply tank, a supply pipe from the tank to the hollow shaft, a shaft seal between the pipe and the inlet end of said shaft, a control valve for regulating the flow of liquid from the tank to the impeller, a power source, and a driving connection between the power source and said shaft for rotating the shaft at a speed greater than that of said power source.

4. A machine for generating a mist or aerosol dispersion of surface wetted powder particles and expelling them into the atmosphere comprising a supporting base, an internal combustion engine mounted on said base, a gear box mounted on the engine, a cover for the gear box, a tunnel connected to the cover and extending forwardly thereof, a shroud connected to the tunnel and extending rearwardly thereof and said gear box, a shaft rotatably mounted in the tunnel, an impeller and fan mounted on the shaft, a liquid supply tank, a liquid supply line connecting the tank and impeller, said supply line including a control valve, a powder supply hopper positioned above the shroud, a valved discharge line from the hopper to the shroud for delivering powder thereto and to the suction side of the fan, and gearing in the gear box for driving the shaft from the engine.

5. A machine for generating a mist or aerosol dispersion of surface wetted powder particles and expelling them into the atmosphere comprising a base, an engine mounted on the base, a gear box connected to the engine, a cover for the gear box formed with a forwardly projecting hollow boss, bearings in the gear box and boss and a hollow shaft rotatably mounted in said bearings, a fan and an impeller mounted on the shaft forwardly of the boss, a tunnel around the boss and shaft, said tunnel having a forward end terminating at the periphery of the impeller, a shroud extending rearwardly of the tunnel, a powder supply hopper mounted above the shroud and having a valved discharge line communicating with the shroud, a liquid supply tank, a valved liquid supply line connecting the tank and the impeller, and gearing in the gear box connecting the engine and shaft to rotate the shaft at a speed greater than that of the engine, said engine driving the shaft to rotate the fan in a direction inducing a flow of powder from the shroud through the fan and thence through the tunnel and past the periphery of the impeller.

6. A machine for generating a mist or aerosol dispersion of surface wetted powder particles and expelling them into the atmosphere comprising a base, an engine on the base, a tunnel supported from the base above the engine, a shroud connected to the tunnel and projecting rearwardly thereof, a powder hopper positioned over the shroud and having a valved discharge line communicating with the shroud, a bearing housing concentrically mounted in the tunnel in spaced relation to the internal wall thereof, a hollow shaft rotatably mounted in the housing, a fan and an impeller on the shaft at opposite ends of the housing, said fan being positioned adjacent the shroud and said impeller being positioned adjacent the outlet end of the tunnel, a liquid supply tank and a supply line from the tank to the end of the hollow shaft adjacent the shroud, a control valve in the supply line, a shaft seal between the supply line and the shaft, and a driving connection from the engine and the shaft to rotate the shaft in a direction inducing a flow of air through the shroud and into the tunnel for discharge past the periphery of the impeller.

References Cited in the file of this patent

UNITED STATES PATENTS

| | | |
|---|---|---|
| 1,785,932 | Brown et al. | Dec. 23, 1930 |
| 1,788,345 | Skirvin | Jan. 6, 1931 |
| 2,476,960 | Daugherty | July 26, 1949 |